United States Statutory Invention Registration [19]

[11] Reg. Number: H555

Ritter et al. [43] Published: Dec. 6, 1988

[54] MOISTURE ABSORBING ANTI-ARCING COATING AND METHOD FOR APPLYING SAME

[75] Inventors: Catharine A. Ritter, Cockeysville; Robert W. Kreps, Glen Burnie, both of Md.

[73] Assignee: The United States of America as represented by the Secretary of the Navy, Washington, D.C.

[21] Appl. No.: 596,786

[22] Filed: Apr. 4, 1984

[51] Int. Cl.[4] ..... C08J 3/02

[52] U.S. Cl. ..... 524/507; 523/173; 523/177; 525/123; 524/560

[58] Field of Search ..... 523/173, 177; 525/123; 524/560

[56] References Cited

U.S. PATENT DOCUMENTS

| | | | |
|---|---|---|---|
| 3,376,252 | 4/1968 | Peiser | 525/123 |
| 3,798,186 | 3/1974 | Nakada et al. . | |
| 3,933,760 | 1/1976 | Sekmakas | 525/123 |
| 3,963,632 | 6/1976 | Tanaka | 521/28 |
| 3,985,688 | 10/1976 | Speech | 521/113 |
| 4,011,168 | 3/1977 | Uhlmann | 524/267 |
| 4,069,357 | 1/1978 | Miller et al. | 428/469 |
| 4,177,322 | 12/1979 | Homan et al. | 428/383 |
| 4,234,468 | 11/1980 | Dalibor | 525/123 |
| 4,263,161 | 4/1981 | Bartak . | |
| 4,282,333 | 8/1981 | Irie | 525/123 |

FOREIGN PATENT DOCUMENTS

| | | | |
|---|---|---|---|
| 6133327 | 10/1981 | Japan | 524/873 |

*Primary Examiner*—John F. Terapane
*Assistant Examiner*—Eric Jorgensen
*Attorney, Agent, or Firm*—Robert F. Beers; Henry Hansen

[57] ABSTRACT

A moisture absorbing, anti-arcing compound comprises a mixture of a moisture active isocyanate resin and a generic anti-arcing compound. The isocyanate resin reacts with residual moisture in a high voltage ceramic insulator, thus tying it up chemically. This prevents diffusion of the moisture into the anti-arcing compound and resultant degradation. The compound according to this invention is especially useful for ceramics which may not be baked dry at elevated temperatures.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOISTURE ABSORBING ANTI-ARCING COATING AND METHOD FOR APPLYING SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to ceramic insulators and more particularly to a composition for coating such insulators in order to improve their anti-arcing capability.

Ceramic components intended for high voltage insulator service must be virtually moisture free in order to preclude failure due to arcing or flashover. A standard practice for removing moisture from ceramic insulators is to bake the insulators at elevated temperatures under vacuum conditions. While still under vacuum, an anti-arcing coating is applied to the insulator. Such anti-arcing compounds usually consist of an acrylic polymer dissolved in a solvent, several varieties of which are commercially available.

Many ceramics are, however, temperature or pressure sensitive. High temperature baking under vacuum is not feasible for removing traces of moisture from such ceramics. Furthermore, drying under vacuum below the ceramic's temperature limit has proven insufficient when high voltage service is intended. It appears that residual water from the ceramic crystals diffuses into the anti-arcing coating and causes failure of the coating interface at high voltage conditions.

Additionally, most anti-arcing coatings are rather brittle and thus do not have good impact resistance. Furthermore, there is presently no effective means for readily determining the presence of large amounts of residual moisture in the ceramic component.

SUMMARY OF THE INVENTION

Accordingly, one object of the present invention is to improve the anti-arcing capability of high voltage ceramic insulators which are temperature or pressure sensitive.

Another object of this invention is to prevent high voltage failure of ceramic insulators due to residual moisture in the ceramic material.

A further object of this invention is to chemically tie up residual water in high voltage ceramic components by incorporating a moisture active material in an anti-arcing coating applied to the surface of such components.

A still further object of this invention is to reduce the brittleness of the anti-arcing coating applied to high voltage ceramic insulators.

Yet anther object of this invention is to visually indicate the presence of high levels of moisture in high voltage ceramic insulators when the anti-arcing coating is applied.

Still another object of this invention is to provide a method for improving the anti-arcing characteristic of high-voltage ceramic insulators which cannot be baked at elevated temperatures to remove trace amounts of moisture.

Yet a further object of this invention is to provide a high-voltage ceramic insulator which is highly resistant to arcing without the usual bake drying at elevated temperatures.

The above and other objects are realized by a moisture absorbing, anti-arcing compound applied to the surface of a high voltage ceramic insulator. This compound is formed by intermixing an isocyanate resin with a generic anti-arcing compound of the type comprising an acrylic polymer dissolved in a solvent. The isocyanate resin combines with the solvent to form a moisture active agent which chemically ties-up residual moisture in the ceramic, thereby preventing diffusion into the anti-arcing coating.

Other advantages and novel features of the invention will become apparent from the detailed description of the invention which follows.

DESCRIPTION OF THE PREFERRED EMBODIMENT

The preferred embodiment of a composition according to this invention incorporates a hydrophilic organic material in a generic anti-arcing compound. Such compounds generally consist of an acrylic polymer dissolved in a solvent. Typical solvents used are toluene and methyl-ethyl-ketone (MEK).

Certain isocyanate-terminated prepolymers or isocyanate resins will react with water to form other anhydrous compounds. The inventors have discovered that by intermixing such isocyanate resins with the anti-arcing coating before applying the coating to a ceramic insulator, residual moisture in the ceramic is tied up chemically and thus will not degrade the electrical properties of the anti-arcing compound. Toluene diisocyanate and 4,4'-diphenylmethane diisocyanate (bis-methylene diisocyanate) are examples of the moisture active agent formed by addition of the isocyanate resins.

The isocyanate resin may be mixed in with the anti-arcing compound prior to application. The proportion of isocyanate resin to be added should be on the order of 1% or more. Although larger proportions will result in greater moisture absorbability, there is a point at which the dielectric strength of the composition will begin to degrade. The upper limit on the amount of isocyanate resin to be used is thus a function of the dielectric strength degradation which can be tolerated for a given application. Once an acceptable level of dielectric strength is selected for a given application, then the maximum amount of isocyanate resin can be readily determined. The exact relation between the two parameters can be easily determined by experiment. This will of course vary depending on the manufacturer and grade of the anti-arcing coating as well as the isocyanate resin.

The process for applying the composition would comprise the standard steps of cleaning the surface with a surfactant and then drying under vacuum conditions. The moisture absorbing, anti-arcing coating may then be applied by either dipping, brushing-on, or spraying. The entire process may be done at room temperature or at any temperature above 30° F., but within the temperature limit of the particular ceramic material.

In addition to the moisture absorbing function the isocyanate resin will also act as an external plasticizer to reduce the normal brittleness of the anti-arcing compound. The impact resistance of the coating should thereby be improved.

Furthermore, if large amounts of water are present, the isocyanate prepolymer will generate visible bubbles which would readily indicate the existence of such moisture. Such visual indication would prevent use of ceramics having retained moisture levels which are greater than the isocyanate prepolymer could handle.

Some of the advantages and new features of the subject invention should now be apparent in view of the foregoing description. For example a moisture absorbing, anti-arcing composition has been described which may be applied to the surface of a high voltage ceramic insulator. The moisture absorbing component reacts with residual moisture in the ceramic material and thus prevents it from diffusing into and degrading the anti-arcing component. An improved ceramic insulator is thereby provided.

Numerous modifications and variations of the subject invention are possible in light of the above teachings. It is therefore to be understood that within the scope of the appended claims the invention may be practiced otherwise than as specifically described.

What is claimed is:

1. An improved coating composition for ceramic electrical insulators, the coating composition being of the type having an acrylic resin dissolved in a solvent, wherein the improvement comprises: isocyanate containing material selected from the group consisting of isocyanate-terminated prepolymers and monomeric isocyanates intermixed with the acrylic resin solution in a proportion sufficient to provide maximum moisture absorbability without degrading the dielectric strength of the electrical insulating coating below a selected limit.

2. The coating composition of claim 1 wherein the isocyanate containing material is a moisture-active agent selected from the group consisting of toluene diisocyanate and 4,4'-diphenylmethane diisocyanate.

3. The coating composition of claim 2 wherein the isocyanate containing material on the order of 1% or more of the coating composition.

4. A method for improving the anti-arcing characteristic of a high voltage ceramic insulator containing trace amounts of moisture, comprising the steps of:

cleaning the ceramic insulator by applying a surfactant thereto;

drying the cleaned insulator; and applying a moisture absorbing, anti-arcing coating to the dried insulator.

5. A method as recited in claim 4 wherein the moisture absorbing, anti-arcing coating comprises:

an anti-arcing coating; and an isocyanate resin intermixed with the anti-arcing coating in an amount sufficient to provide an optimum balance between the moisture absorbability and the dielectric strength of the moisture absorbing, anti-arcing coating.

6. A method as recited in claim 5 wherein the anti-arcing coating comprises an acrylic polymer dissolved in a solvent, said solvent selected from the group consisitng of toluene and methyl ethyl ketone.

7. A method as recited in claim 6 wherein the isocyanate resin is selected from the group consisting of toluene diisocyanate and bis-methylene-diisocyanate.

8. A method as recited in claim 7 wherein the amount of the isocyanate resin intermixed is at least 1% of the amount of the anti-arcing coating.

9. A method as recited in claim 8 wherein all of the steps are performed at room temperature.

10. Apparatus for insulating an energized high voltage conductor comprising in combination:

a ceramic member disposed between said high voltage conductor and ground; and a moisture absorbing, anti-arcing composition coated on said ceramic member.

11. Apparatus as recited in claim 10 wherein the moisture absorbing, anti-arcing composition comprises:

an anti-arcing coating; and an isocyanate resin intermixed with the anti-arcing coating in an amount sufficient to provide an optimum balance between the moisture absorbability and the dielectric strength of the moisture absorbing, anti-arcing coating.

12. Apparatus as recited in claim 11 wherein the isocyanate resin comprises toluene diisocyanate.

13. Apparatus as recited in claim 11 wherein the isocyanate resin comprises bis-methylene-diisocyanate.

14. In the combination of a ceramic insulator and an acrylic resin composition present as an anti-arc coating disposed thereon, the improvement which comprises:

isocyanate containing materials intermixed with the resin composition, the materials being selected from the group consisting of isocyanate-terminated prepolymers and monomeric isocyanates.

* * * * *